United States Patent [19]

Kelley et al.

[11] Patent Number: 5,011,240

[45] Date of Patent: Apr. 30, 1991

[54] SEGMENTED SIDE WALL CART

[75] Inventors: James O. Kelley, Spring Lake; Steven F. Goodman, Wyoming, both of Mich.

[73] Assignee: Milcare, Inc., Zeeland, Mich.

[21] Appl. No.: 442,188

[22] Filed: Nov. 28, 1989

[51] Int. Cl.⁵ .............................................. A47B 91/00
[52] U.S. Cl. ..................................... 312/250; 312/264
[58] Field of Search ............... 312/108, 264, 250, 257, 312/286; 211/186, 126, 162

[56] References Cited

U.S. PATENT DOCUMENTS

| | | |
|---|---|---|
| 1,097,163 | 5/1914 | Brown . |
| 1,691,621 | 11/1928 | Young . |
| 2,385,559 | 9/1945 | Wenthe . |
| 2,565,784 | 8/1951 | Sheean ................................ 312/286 |
| 3,346,315 | 10/1967 | Proulx ............................. 312/257.1 |
| 3,610,429 | 10/1971 | MacKay . |
| 3,712,697 | 1/1973 | Kelley . |
| 3,716,282 | 2/1973 | Propst . |
| 3,868,123 | 2/1975 | Berg . |
| 4,045,104 | 8/1977 | Peterson . |
| 4,201,428 | 5/1980 | Johnson ........................... 312/108 X |
| 4,393,667 | 12/1988 | Gilliom ............................ 312/108 X |
| 4,616,890 | 10/1986 | Romick . |
| 4,643,493 | 2/1987 | Sides, Sr. . |
| 4,678,214 | 7/1987 | Cohn et al. . |
| 4,681,378 | 7/1987 | Hellman, III . |
| 4,747,644 | 5/1988 | Gallery . |
| 4,768,845 | 9/1988 | Yeh . |
| 4,786,122 | 11/1988 | Nichoalds . |
| 4,787,687 | 11/1988 | Merl . |
| 4,793,667 | 12/1988 | Gilliom ............................ 312/108 X |

Primary Examiner—Joseph Falk
Attorney, Agent, or Firm—Varnum, Riddering, Schmidt & Howlett

[57] ABSTRACT

A utility cart with front, back, side, top and bottom walls includes a housing having a pair of U-shaped frames spanning the front and back portions of the cart. Each of the U-shaped frames has a pair of upright legs joined by a bottom bight portion. At least two side wall segments form opposite sides of the cart. Each of the side wall segments has at side edges thereof frame-receiving openings shaped to receive legs of the U-shaped frame member. The side wall segments are spaced apart by the U-shaped frames with the legs of the U-shaped frames retained by the frame-receiving openings. The upper portions of the upright legs of each of the U-shaped frame members are joined together and drawers are slidably mounted to the side wall segments. Integrally molded glides are formed on the inner faces of the side wall segments. The drawers have glide flanges mounted on the sides cooperable with the molded glides slidably mounting the drawers on the glides. Stops are formed on the drawer glides and drawers to retain the drawers in a closed position within the cart and to prevent the drawers from being inadvertently pulled from the cart. Castors are mounted to the bottom of the U-shaped frames at bottom portions thereof to support the cart on wheels. The cart can have a central vertical spine and double-faced walls mounted to the vertical spine to form a vertical partition in the cart for mounting two rows of drawers in side-by-side relationship.

24 Claims, 7 Drawing Sheets

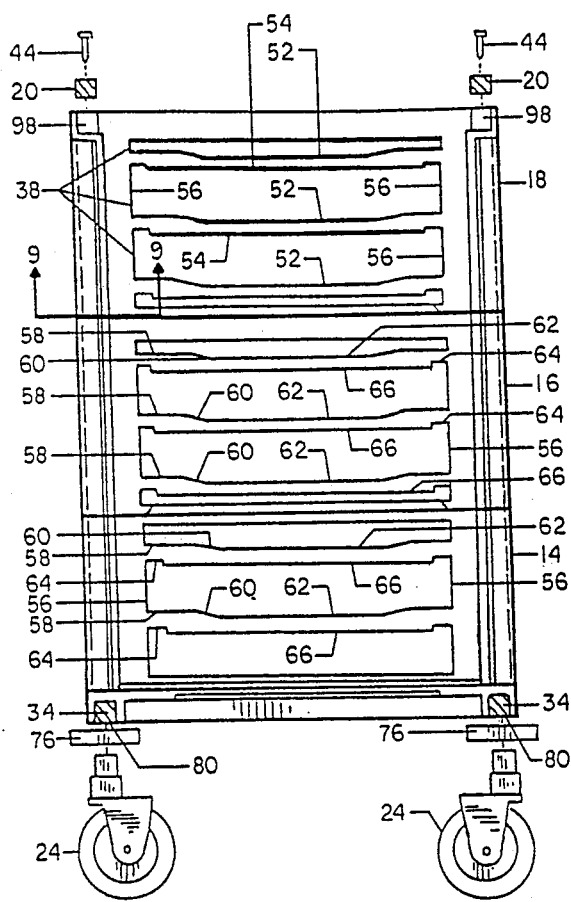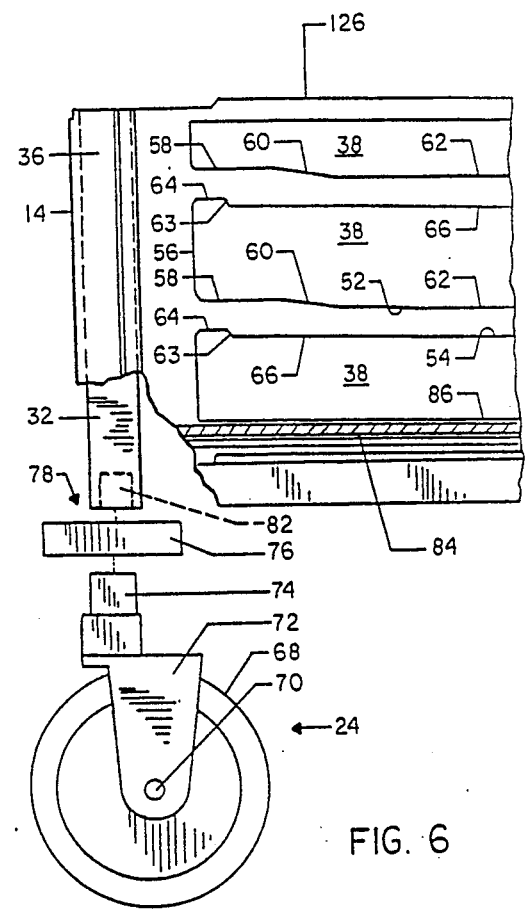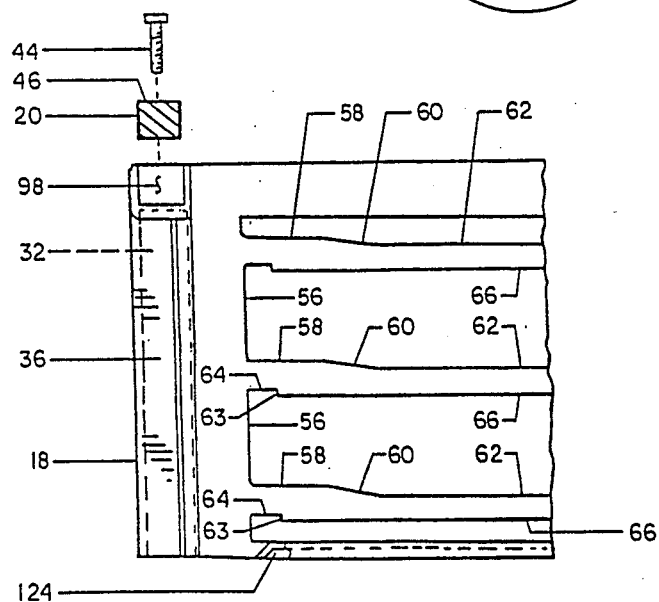
FIG. 5
FIG. 6
FIG. 7

SEGMENTED SIDE WALL CART

TECHNICAL FIELD

The invention relates to carts and, more particularly, to carts having a frame which mounts side wall segments in telescoping fashion and a plurality of drawers, shelves and other space dividing/organizing components supported by the side walls through integral glides.

BACKGROUND OF THE INVENTION

It is well known for carts to be designed with slidably mounted drawers and to include castors or other suitable means for easy mobility of the cart. Further, carts are typically constructed with a three dimensional-rectangular frame to which drawer glides and castors may be attached. The rectangular frames typically require the assembly of numerous frame pieces to create the rectangular frame. In addition, the assembly time for such a cart might be quite lengthy, and the number of easily adaptable variations may be limited.

The U.S. Pat. No. 3,868,123 to Berg, et al. (issued Feb. 25, 1975) discloses a food service storage vehicle wherein the supporting frame is constructed of four vertically parallel support posts which mount directly in a rigid rectangular base and rigid rectangular top to create the cart frame. Castors are mounted in the bottom of the rectangular base and support posts and drawer glides are provided on the internal face of the plastic side wall sections.

The U.S. Pat. No. 3,610,429 to MacKay (issued Oct. 5, 1971) and the U.S. Pat. No. 1,691,621 to Young (issued Nov. 10, 1925) both disclose carts with three dimensional, rectangular frames. The carts incorporate drawer glides for slidably mounted drawers or trays and castors for easy mobility.

Carts which are designed for easy assembly and disassembly are disclosed in the U.S. Pat. No. 2,385,559 to Wenthe (issued June 26, 1944) and U.S. Pat. No. 1,097,163 to Brown (issued May 19, 1914). Both of these carts have vertical support posts with drawer glides or trays fixedly mounted thereto. In addition, each cart is adapted for easy assembly and disassembly. In Wenthe, the side posts are slidably inserted into a socket affixed to a rectangular base. The Brown side posts are inserted through openings in the corners of fixed trays.

The U.S. Pat. No. 4,045,104 to Peterson (issued Aug. 30, 1977) discloses a cabinet structure and method for construction for easy assembly and disassembly which utilizes no bolts or screws. The rectangular frame of the cabinet is created through the assembly of a plurality of frame members and corner members.

SUMMARY OF THE INVENTION

According to the invention, a utility cart has a front, back, sides, top and bottom and comprises a housing having a pair of U-shaped frames spanning the front and back portions of the cart. Each of the U-shaped frames comprises a pair of upright legs joined by a bottom bight portion. At least two side wall segments form opposite sides of the cart, each of the side wall segments having a frame receiving means at side edges thereof and are shaped to receive the legs of the U-shaped frame member. At least two side wall segments are spaced apart by the U-shaped frames with the legs of the U-shaped frames being retained by the receiving means. Means connect the upper portions of the upright legs of each of the U-shaped frame members together. A plurality of drawers are slidably mounted to the side wall segments.

Preferably, the receiving means comprise vertical channels and the frame legs are slidably received in the channels. Further, the side wall segments have inner faces with integrally molded glides and the drawers have glide flanges mounted on the sides and are cooperable with the molded glides for slidably mounting the drawers on the molded glides. Stop means and retainer means are preferably formed on the glides to retain the drawers from being inadvertently removed from the cart. The glides are preferably symmetrical about a vertical plane so that they are interchangeable and the drawers can be withdrawn from and pushed into the cart from either side of the cart.

The cart may have numerous optional features incorporated such as castors which are inserted through an opening in the corner of the base side wall segment into a socket in the lowermost portion of the vertical member of the U-shaped frame. A top can also be fixedly mounted to the cart through the use of a plurality of mounting brackets and screws, the mounting brackets are fixedly attached to the spanner and the screws are inserted through appropriate holes in the bracket and threaded directly into the top. Further, a back wall may be included in the cart; the back wall is inserted into a vertical U-shaped channel which is integrally molded into opposing internal faces of the side wall segments. A further optional feature is a lower deck. The lower deck is supported by a pair of lower deck glides integrally molded into the opposing internal faces of the base side wall segments. The lower deck is slidably mounted on the lower deck glide for easy insertion and removal. Handles may be fixedly mounted to the outside surface of the side wall segments through the use of screws which are threaded directly into the side wall segment and into the vertical legs of the U-shaped frame. The handles may be used for steering the cart during transportation. In addition, rails may be attached to the cart in a similar manner that would enable the attachment of a variety of equipment including intravenous apparatus, shelving and other accessories.

The cart is suitable for a wide variety of varying designs and applications. Through the use of varying lengths of vertical members of the U-shaped frames and different numbers of side wall segments, the cart can be adapted to various heights. In addition, the cart can be adapted to accommodate two vertical stacks of drawers in side-by-side relationship. The bight portion of the U-shaped frame and the spanner bar are manufactured to the necessary length and a pair of vertical frame supports are fixedly mounted to the center of the bight portion of the U-shaped frame. Center segment channels are telescopically mounted on the vertical frame supports analogous to the manner in which the side wall segments are mounted, then the spanner is fixedly attached to the vertical frame support. Integrally molded on the side faces of the center segments are drawer glides corresponding to the drawer glides on the side wall segments. The plurality of drawers are arranged side-by-side on the drawer glides.

BRIEF DESCRIPTION OF DRAWINGS

The invention will now be described in detail with reference to the accompanying drawings wherein:

FIG. 5 is a side elevational view of the cart shown in FIG. 3 along lines 5—5 of FIG. 3 in the constructed state;

FIG. 6 is a partial exploded cutaway elevational view of the cart in FIG. 1;

FIG. 7 is a partial view along lines 7—7 of FIG. 3 showing the connection of the top spanner to the top segment;

DESCRIPTION OF THE PREFERRED EMBODIMENT

Figure 1:
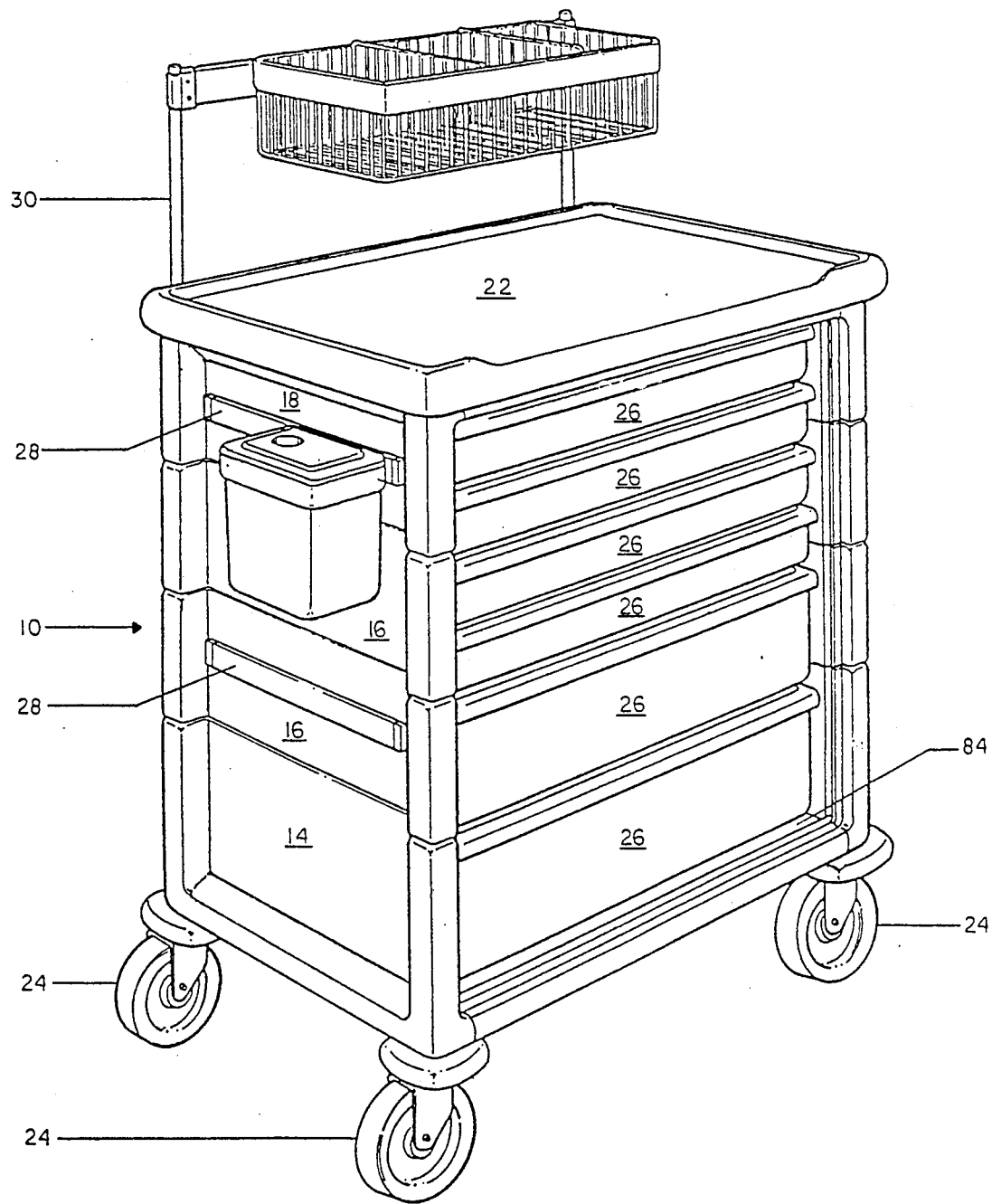
FIG. 1 is a perspective view of a cart assembly according to the invention.
Figure 3:
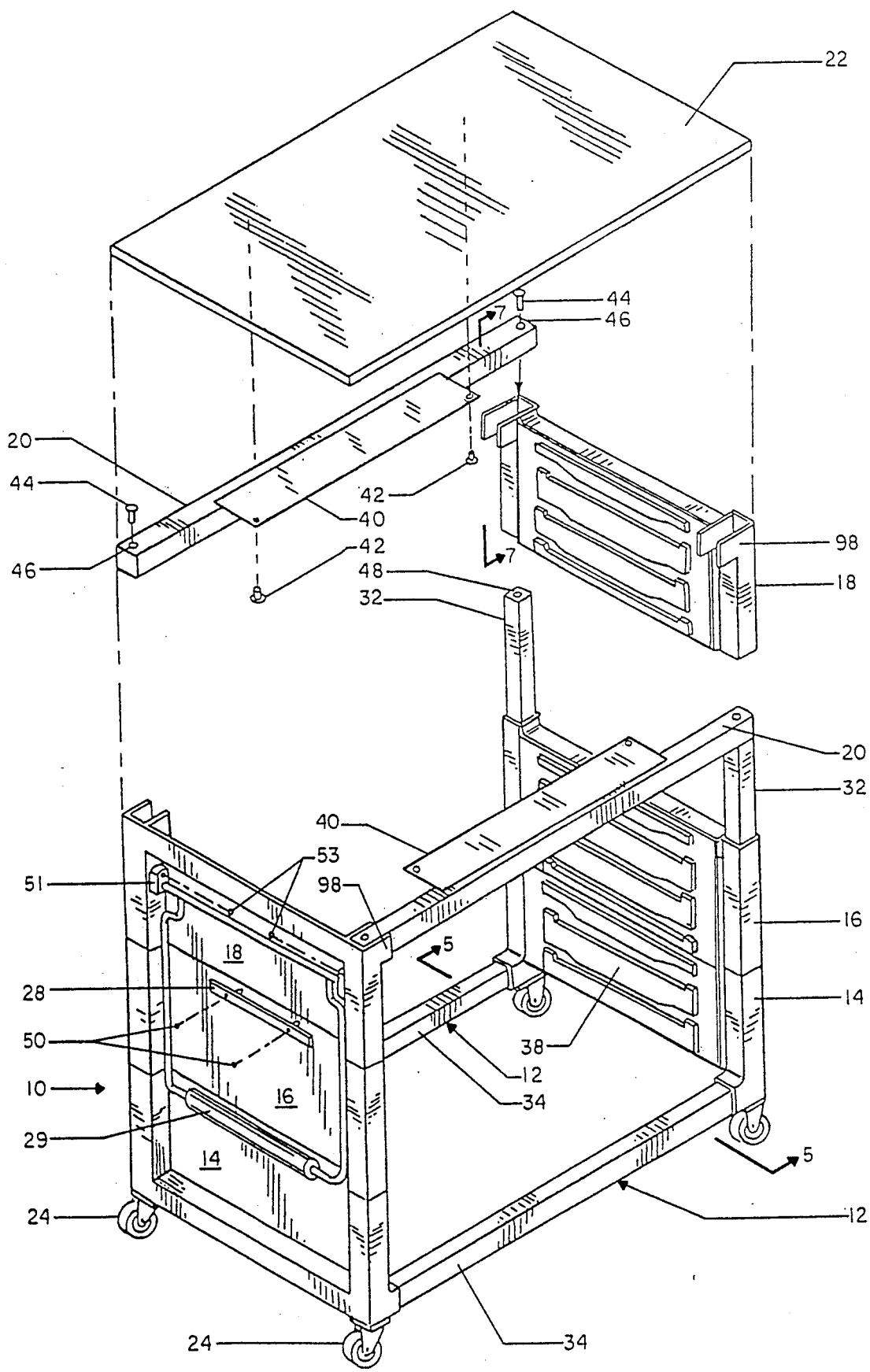
FIG. 3 is a perspective view of a cart assembly according invention in partial exploded view.
Figure 4:
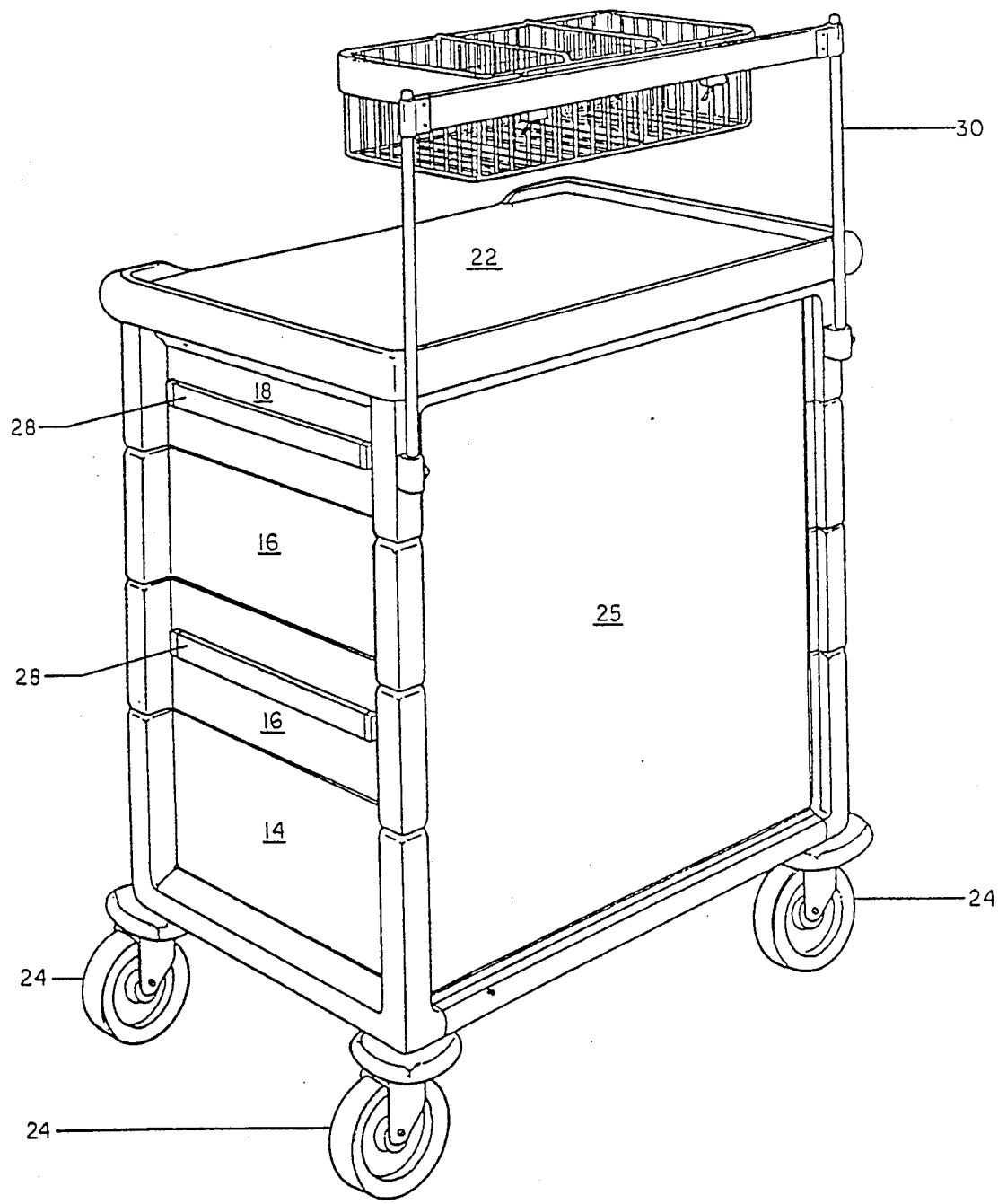
FIG. 4 is a perspective view of the rear of the cart assembly according to the invention.

Referring to FIGS. 1 and 4, a cart 10 comprises a plurality of side wall segments (a base segment 14, a middle segment 16, and a top segment 18) forming side walls of the cart, a top surface 22 forming a top surface of the cart, a plurality of castors 24, a back wall 25 forming a back wall of the cart and a lower deck 84 forming a bottom surface of the container. Castors 24 are mounted beneath the lower deck to support the Cart. A plurality of drawers 26 are mounted between the side wall segments. Rails 28 are mounted to side wall segments 16 and 18 for supporting medical equipment. An accessory rack 30 is mounted at a back portion of the cabinet to support baskets or similarly mounted items. A handle 29 (FIG. 3) can also be mounted to the top side wall segment 18.

Figure 2:
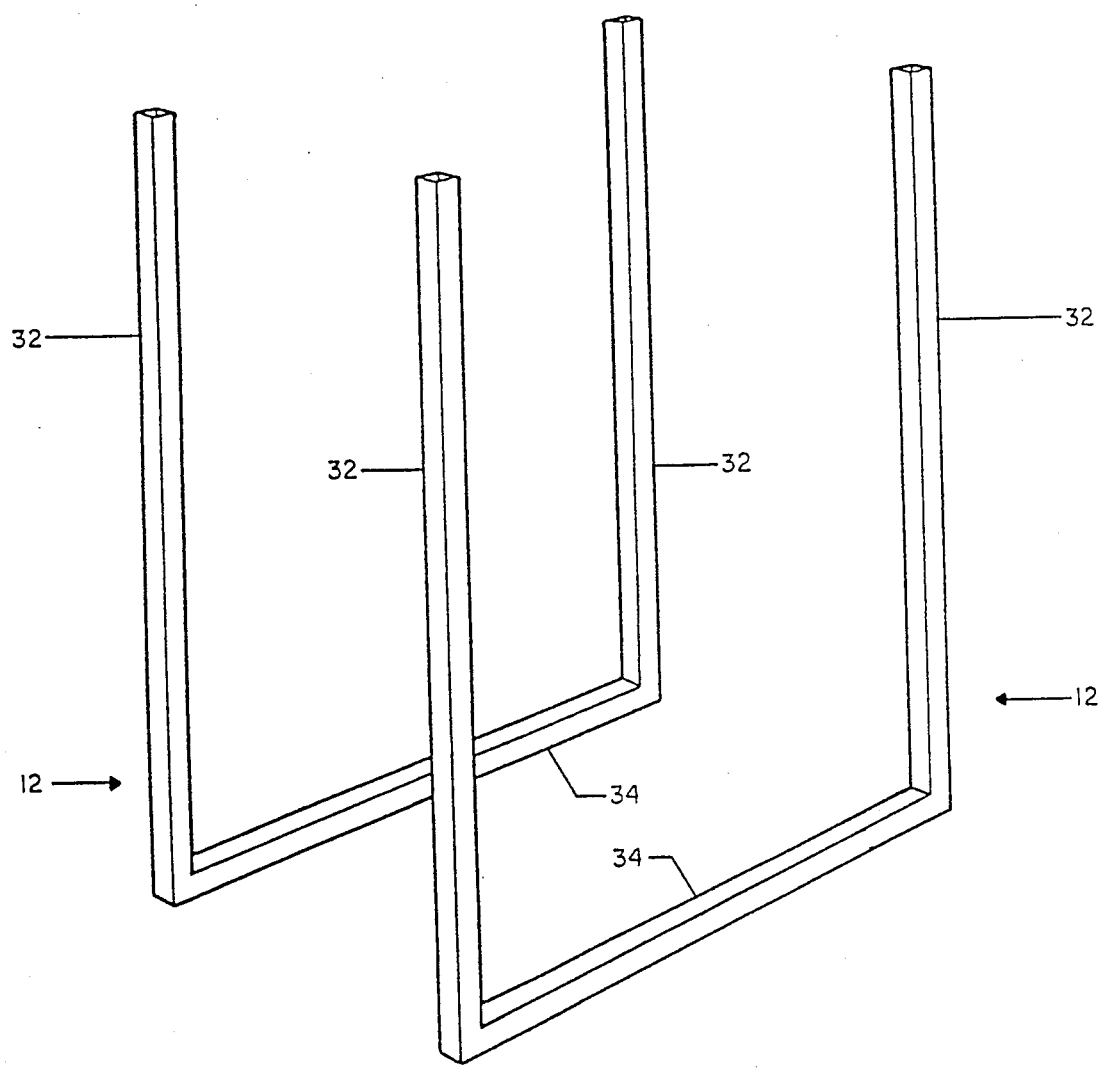
FIG. 2 is a perspective view of the U-shaped frames in the unassembled state.

The basic underlying structural support for the cart is two U-shaped frames 12 which are illustrated in FIG. 2. These two frames 12 slidably receive the side wall segments, support the top surface 22 and mount the castors 24. As seen in FIG. 2, the U-shaped frames 12 are rectangular in cross-section and comprise two vertical members 32 and a horizontal connecting member 34. The U-shaped frames 12 may be made of a suitable metal such as steel.

Figure 9:
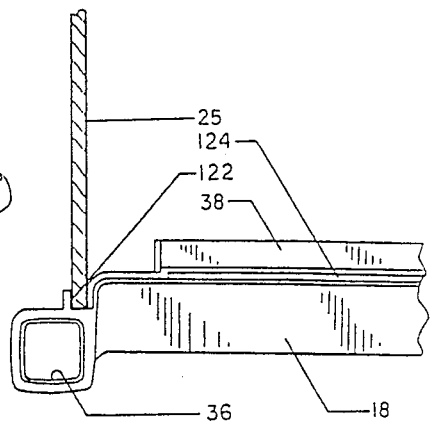
FIG. 9 is a partial sectional view through lines 9—9 of FIG. 5, showing a back wall/side wall interface.

As seen in FIG. 3, the cart is easily assembled. Two U-shaped frames 12 are placed parallel to each other and the vertical members of the U-shaped frame telescopically receive each of the side wall segments 14, 16 and 18, through a pair of segment channels 36 (FIG. 9). The segment channels 36 (FIG. 9) are located on opposite ends of the sidewall segments 14, 16 and 18. After the top sidewall segment 18 has been telescopically mounted on the vertical member of the U-shaped frames 32, a spanner 20 is affixed to the upper-most portions of the vertical members of the U-shaped frame 32 through mounting screws 44, thereby preventing movement or removal of the side wall segments 14, 16, 18. The mounting screws 44 are inserted through an appropriate opening 46 in the spanner 20 and are threaded directly into a threaded mounting 48 on the top of the vertical member of the U-shaped frames 32. The spanner 20 is made of a suitable metal such as steel, and the side wall segments 14, 16, 18 are preferably constructed of injection molded plastic. When assembled, the two U-shaped frames 12, the side wall segments 14, 16 and 18, and the spanner bars form a six-sided geometrical structure which is open on two of its four sides and the top and bottom.

A top surface 22 can be removably attached to the spanners 20 of the cart 10 through mounting brackets 40 and mounting screws 42. The mounting brackets 40 are flat. One end of the bracket 40 is welded directly to the spanner 20 such that the other end extends toward the interior of the cart 10. Mounting screws 42 extend through the mounting brackets 40 and are threaded directly into the top surface 22 to secure the top surface of the cart 22. The incorporation of the lower deck 84 on the bottom of the cart 10 will be discussed below.

Figure 8:
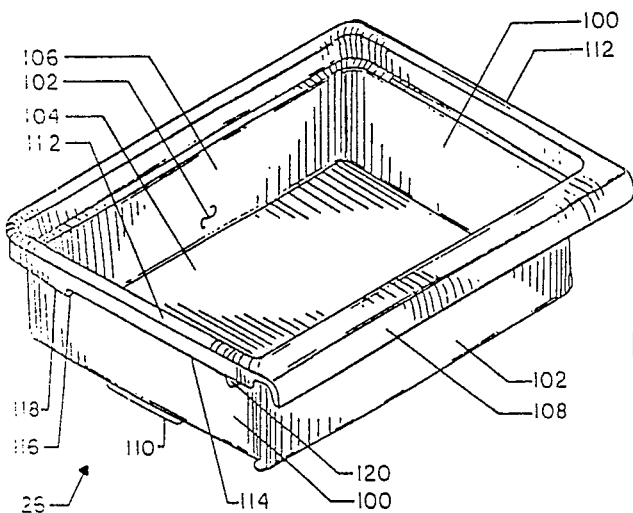
FIG. 8 is a perspective view of a drawer used in the cart of FIG. 1, showing glides on the sides thereof.

In addition to the segment channels 36, each of the sidewall segments, 14, 16, 18 incorporate a plurality of drawer glide projections 38 on the internal faces of the sidewall segments. The drawer glide projections 38 provide support for the drawers 26 (FIG. 8).

The cart may be steered and controlled during transfer through the incorporation of a handle 29. The handle is essentially rectangular in form and mounted to the cart 10 through two mounting brackets 51. The mounting brackets are secured to the cart through mounting screws 53. The mounting screws are threaded directly into the sidewall segments 18 and into the vertical member of the U-shaped frame 32.

The cart 10 lends itself to numerous modifications and adaptations. One such optional feature is the incorporation of rails 28. The rails can be removably attached to the outer surface of one of the side wall segments, 14, 16, 18 by a plurality of mounting bolts 50 which are threaded directly into the side surface of the side wall segments 14, 16 and 18 and secured by a plurality of nuts (not shown). The rails 28 may be used to attach a wide variety of equipment such as intravenous apparatus, oxygen tanks, shelving and other accessories to the cart.

The rear of the cart may be seen in FIG. 4. The back wall 25 encloses the entire rear surface of the cart 10 preventing access to the drawers 26. This view also shows the means for mounting the accessory rack 30. Mounting brackets 92 are secured to the top segment 18 through a plurality of mounting screws. The mounting screws are threaded directly into the side wall segment 18 and the vertical member of the U-shaped frame 32. The accessory rack allows a wide variety of equipment to be mounted to the cart 10.

As seen in FIG. 5, the side wall segments 14, 16, 18 have drawer glide projections 38 formed in the interior face of each side wall. As stated earlier, the side walls are preferably constructed of injection molded plastic and, therefore, the drawer glides can take numerous different forms. In the preferred embodiment, the drawer glides comprise a plurality of projections 38 which extend inward from the internal face of the side walls. The projections 38 are arranged to mount drawers 26 (FIG. 8) which will be described in greater detail below. In the preferred embodiment, each projection 38 has an upper surface 52, a lower surface 54 and a pair of vertical faces 56 connecting the upper and lower surfaces. The upper surface 52 comprises a leading portion 58, a pair of ramp surfaces 60 and a center portion 62. The ramp surface 60 is inclined to connect the horizontal planes of the leading portion 58 and the center portion 62; the leading portion 58 is higher than the center portion 62. The lower surface 54 comprises a pair of short horizontal portions 64, a pair of short vertical portions 63 and a horizontal center portion 66. The short vertical projections 63, on each end of the lower surface 54 cooperate with the leading portion of the upper surface 58 and a plurality of drawer glides 112 on the drawers 26 (discussed below) to prevent inadvertent removal of the drawer 26 from the cart 10. The drawer glide design has been previously described in U.S. Pat. No. 3,716,282 to Propst et al. (issued Feb. 13, 1973), U.S. Pat. No. 3,712,698 to Propst et al. (issued Jan. 23, 1973), and U.S. Pat. No. 3,712,697 to Kelley et al. (issued Jan. 23, 1973).

As seen in FIG. 6, a plurality of castors 24, can be incorporated into the cart 10 in order to make the cart easily movable. The castors 24 are conventional in design and comprise a wheel 68, an axle 70, a body 72 and a stem portion 74. The wheel 68 may be made of rubber or a suitable plastic material to allow for efficient and quiet rolling action of the cart. To provide safety for the cart and other objects in the area, a removable bumper 76 can be mounted to each caster 24 to avoid damage upon collision. The bumpers 76 can be constructed of a suitable rubber or plastic material. The caster 24 and bumper 76 are removably attached to the lower portion of the vertical frame member 32 through the stem portion 74 of the caster 24. The stem 74 extends through an opening in the bumper 78, through an opening in the bottom corner 80 (FIG. 5) of the base segment 14 and into a socket 82 in the bottom end of the vertical member 32 of the U-shaped frame 12.

FIG. 6 also depicts the manner in which the optional lower deck 84 can be mounted. As seen in FIG. 6, the base segment 14 is designed to include a lower deck glide 86. The lower deck glide 86, analogous to the drawer glide projections 38, is a projection which extends inward from the internal face of the base segment 14 a short distance to support the lower deck 84. The lower deck 84 is slidably supported by the lower deck glide 86 to allow for easy removal and insertion.

FIG. 7 shows the manner in which the spanner 20 is fixedly attached to the vertical members 32 of the U-shaped frame 12. A mounting screw 44 is inserted through an appropriate opening in the spanner 46. The mounting screw 44 is long enough to extend through the spanner 20 into the top of the vertical member 32. A threaded mounting 48 is secured in the upper portion of the vertical frame member 32 to accommodate the mounting screw 44 and fixedly attaches the spanner 20 to vertical frame member 32. The vertical frame member 32 of the U-shaped frame 12 which lies inside of the segment channel 36 is shown in phantom lines in FIG. 7.

The top segment 18 of the cart 10 has a contoured opening 98 at the uppermost portion of each segment channel 36 to accommodate the horizontal spanner 20. The contoured openings 98 are designed such that the spanner bar 20 upper surface is flush with the upper surface of the top segment 18, forming a horizontal plane for the mounting of the top surface 22.

The segmented side wall cart 10 can have drawers and trays of various dimensions. One drawer embodiment 26 is shown in FIG. 8. The drawer 26 is conventional such that it has a pair of side walls 100, a pair of end walls 102, a bottom 104 and an open top 106. In addition to these elements, the drawer 26 has a handle 108, a projection 110 at the center of and bottom of the side wall 100 and a drawer glide 112. The handle 108 is mounted on one of the end walls 102 of the drawer so that the drawer can be easily pulled out from the cart 10. The drawer glides 112 are mounted at the top edge of the side walls 100 of the drawer 26 and extend outward horizontally a short distance from the side walls such that they interact with the drawer glide projections 38 of the segments 14, 16 and 18. The drawer glides 112 comprise an elongated horizontal portion 114, a short vertical stop portion 116, and a short ramp portion 118. A small stop member 120 is provided in a forward portion of the horizontal portion 114 to prevent accidental migration of the drawer from the cart when the cart is in motion. The stop member 120 seats behind the short vertical portion 63 at the front of the cart when the drawer 26 is completely received within the cart. One end of the elongated horizontal portion 114 is adjacent to the handle 108, on the front side of the drawer. The other end of the elongated horizontal portion 114 abuts the short vertical stop portion 116, which in turn abuts the short ramp portion 118 of the drawer glide 112 at the rear of the drawer.

Based upon this simple drawer glide design, it is possible to incorporate a wide variety of components into the cart 10 such as trays, wire racks, and drawers of varying depth.

As the operator grasps the handle 108 of the drawer 26 and begins to remove the drawer 26 from the cart 10, the operator first overrides the stop member 120 from engagement with the vertical portion 63. The drawer glide 112 then slides along the horizontal center portion 66 of the drawer glide projection 38 of the side segments 14, 16, and 18. When the bulk of the drawer 26 has been pulled out horizontally from the cart 10, the vertical stop portion 116 of the drawer glide 112 contacts the vertical portion 63 of the drawer glide projection 38 at the front of the cart. This contact inhibits further removal of the drawer 26 from the cart 10 and any accidental spillage of the contents of the drawer 26. The drawer 26 can be removed from the cart 10 by lifting the drawer 26 vertically a short distance such that the vertical stop portion 116 of the drawer glide 112 no longer contacts the portion 63 of the drawer glide projection 38.

A bottom view of the top segment 18 is depicted in FIG. 9. From this view, the segment channel 36 may be easily seen, in addition to the drawer glide projections 38. A further element which is incorporated into the side wall segments 14, 16, and 18 is a back wall channel 122. The channel 122 is a U-shaped channel suitable for slidably mounting the back wall 25. The channel 122 must be on opposing corners of the side wall segments 14, 16, 18 so that the rigid back wall 25 merely slides into the opposing channels.

Figure 10:
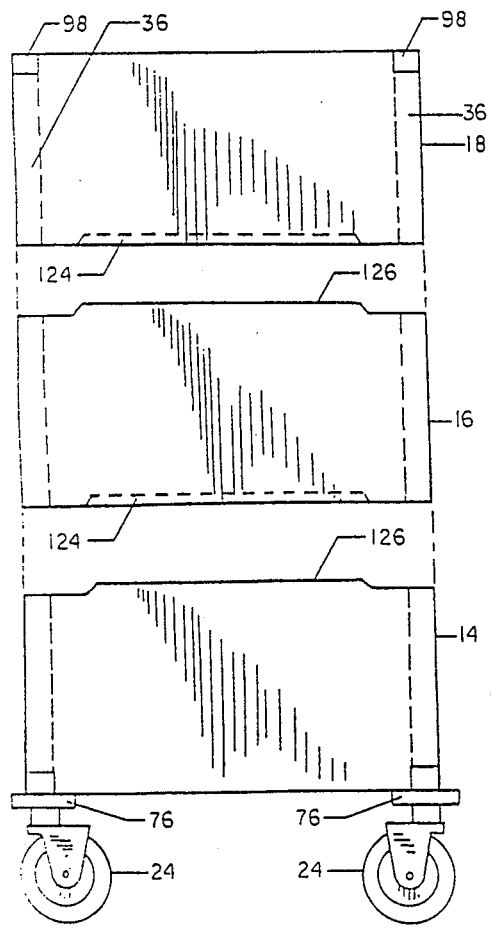
FIG. 10 is a side elevational view of the cart of FIG. 1 in partial exploded view.

FIG. 10 depicts the means by which the segments 14, 16 and 18 are interlocked. The top surfaces of the middle segment 16 and the base segment 14 each have an interlocking projection 126 which extends a short distance from the top surface of each of these segments. The top and middle segments 18 and 16 have an interlocking channel 124 on the underside of the segment. The interlocking projections 126 are designed like a tongue such that they may be received into the interlocking channels 124. This tongue and groove design provides for efficient interlocking of the plurality of segments and therefore a more rigid construction of the cart 10.

Figure 11:
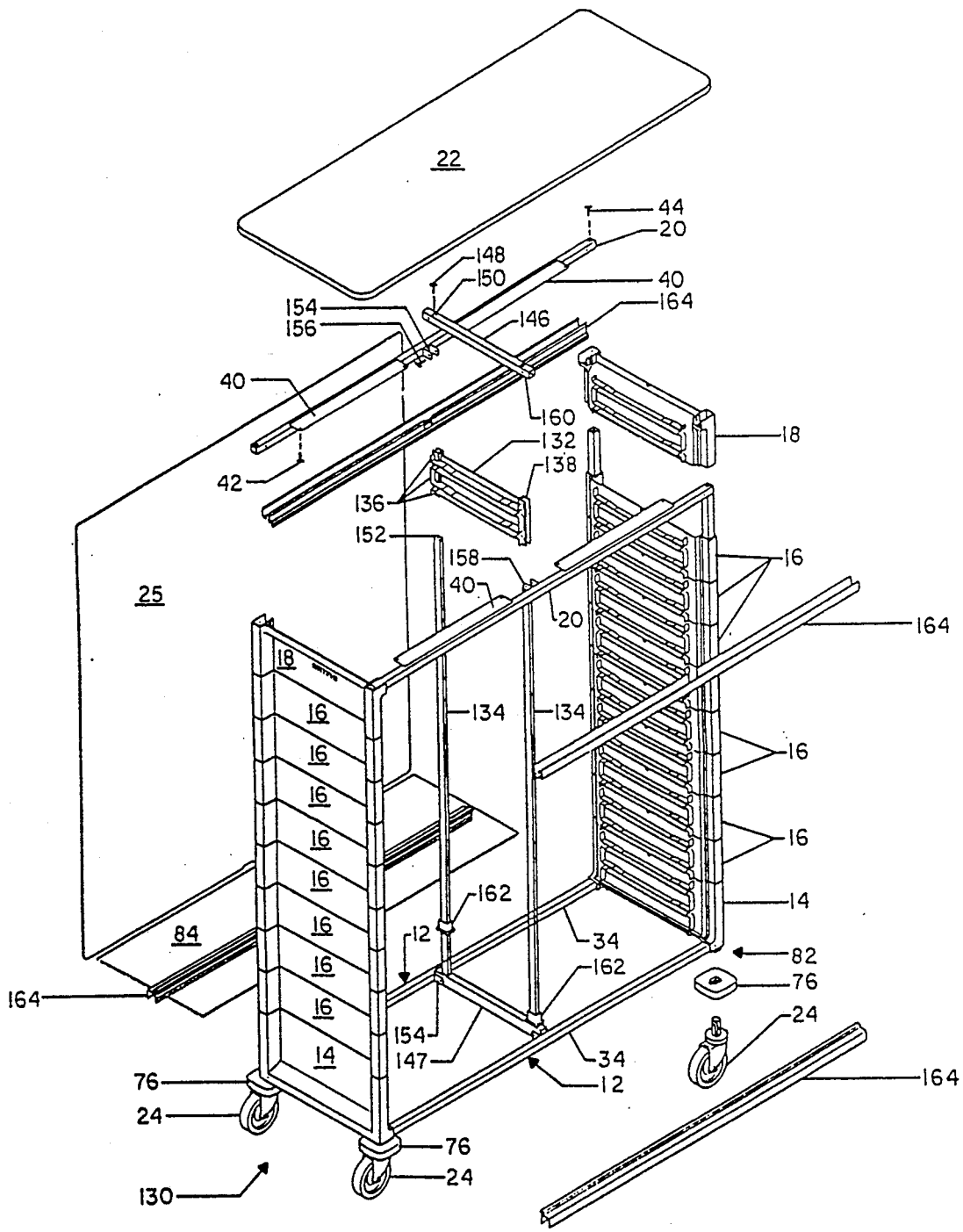
FIG. 11 is a perspective view of the two-drawer stack cart assembly according to the invention in partial exploded view.

As previously stated, the cart 10 may take many different designs and configurations. One of these designs is depicted in FIG. 11. This embodiment is a two-drawer stack of the side wall cart 130. As in the previously discussed embodiment, this embodiment comprises side wall segments 14, 16, and 18, U-shaped frames 12, a top surface 22, a spanner 20, castors 24, bumpers 76, and a back wall 25. In addition to these elements, this embodiment includes center segments 132, vertical frame supports 134 an upper horizontal frame support member 146 and a lower horizontal frame support member 147. The center segments 132 are designed analogous to the middle segment 16. That is, the center segments 132 have a plurality of drawer glide projections 136 which correspond to the drawer glide projections 38 of the side wall segments 14, 16, and 18, and a pair of segment channels 138. The only material differences between the center segments 132 and the middle segment 16 is that the drawer glide projections 136 appear on both sides of the segment rather than just the internal face and the segment channel 138 is U-shaped rather than rectangular as in the middle segment 16. Like the side wall segments 14, 16, 18, the center segments 132 are telescopically mounted on the vertical frame supports 134 to provide stability to the segments.

The vertical frame supports 134 are fixedly attached to the lower horizontal frame support 147 by a suitable means such as welding. The vertical frame supports 134 are fixedly attached to the upper horizontal frame support member 146 by a suitable mounting screw 148. The mounting screws 148 are inserted through an opening in the horizontal frame support 150 and threaded directly into an appropriate threaded mounting 152 in the top of the vertical frame supports 134. The upper and lower horizontal frame support members 146 and 147 are secured to the spanner 20 and the horizontal connecting member of the U-shaped frame 34 by a mounting bracket 154. The bracket 154 is fixedly attached to the center of the spanner 20 and the horizontal connecting member 34 through welding or other suitable means. A mounting bolt 156 is utilized to secure the horizontal frame support 146 to the mounting bracket 154. The mounting bolt 156 is inserted through an appropriate opening in the mounting bracket 158 and an opening in the horizontal frame support 160.

Before the center segments 132 are telescopically mounted on the vertical frame supports 134, a support collar 162 is telescopically mounted at the base of the vertical frame supports 134. The support collars 162 act as a stop means and provides support for the center segments 132.

In order to provide a more aesthetically pleasing cart design and provide protection from the exposed metal of the spanner 20 and the horizontal connecting member 34, a plurality of trim pieces 164 may be attached to the spanner 20 and the horizontal connecting member 34. The trim pieces 164 are U-shaped in design and can be slidably mounted on the spanners 20 and the horizontal frame supports 134. The trim pieces are preferably a suitable extruded plastic. Similar trim pieces can be incorporated on the single drawer cart 10.

As with the single drawer cart 10, the two drawer cart 130 is assembled by mounting the side wall segments 14, 16 and 18 on the vertical members 32 of the U-shaped frames 12. In addition, the castors 24 are mounted in the bottom portion of the U-shaped frame 82; the top surface 22 is fixedly attached to the spanner 20 by a plurality of mounting brackets 40 and mounting screws 42; the spanners 20 are fixedly attached to the top portion of the vertical members of the U-shaped frames 32 by a mounting screw 44.

Figure 12:
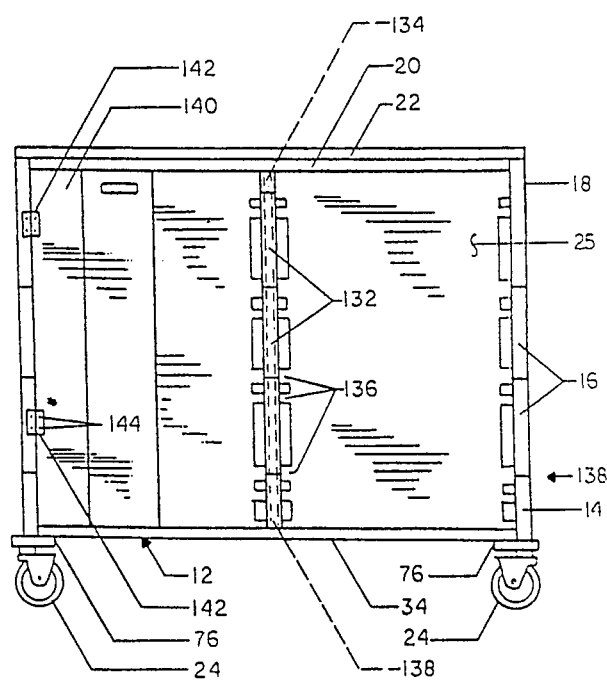
FIG. 12 is a front elevational view of the two-drawer stack cart assembly according to the invention.

Another optional feature which can be incorporated into the cart is panel doors 140, one of which is shown in FIG. 12. The panel door 140 is affixed to the cart 138 by hinges 142 and a plurality of hinge mounting screws 144. The hinges 142 are conventional in design and are fixedly attached to the panel door 140 by the hinge mounting screws 144. The other end of the hinges 142 are fixedly attached to the side wall segments 14, 16 and 18 and the U-shaped frame 12 by the hinge mounting screws 144. The screws 144 are threaded directly into both the side wall segments 14, 16 and 18 and the U-shaped frame members 12.

While particular embodiments of the invention have been shown, it will be understood, of course, that the invention is not limited thereto since modifications may be made by those skilled in the art, particularly in light of the foregoing teachings. It is, therefore, contemplated by the appended claims to cover any such modification as incorporate those features which constitute the essential features of these improvements within the true spirit and the scope of the invention.

We claim:

1. A utility cart having a front, back, side, top, bottom and comprising a housing having a pair of U-shaped frames spanning the front and back portions of said cart, each of said U-shaped frames having a pair of upright legs joined by a bottom bight portion;
   at least two side wall segments forming opposite sides of said cart, each of said side wall segments having frame receiving means at side edges thereof and shaped to receive the -legs-.of the U-shaped frame member;
   said at least two side wall segments being spaced apart by said U-shaped frames with said legs of said U-shaped frames being retained by said receiving means;
   means connecting the upper portions of said upright legs of each of said U-shaped-frame members together; and
   a plurality of drawers or trays slidably mounted to said side wall segments.

2. A utility cart according to claim 1 wherein said receiving means comprise vertical channels and said frame legs are slidably received in said channels.

3. A utility cart according to claim 2 wherein said side wall segments have inner faces with integrally molded glides and said drawers have glide flanges mounted on the sides cooperable with said molded glides for slidably mounting said drawers on said molded glides.

4. A utility cart according to claim 3 wherein stop means and retainer means are formed on said glides to restrict removal of said drawers from said cart.

5. A utility cart according to claim 4 wherein said glides are symmetrical about a vertical plane so that said drawers can be withdrawn from and pushed into said cart from the front or back thereof.

6. A utility cart according to claim 1 and further comprising castors mounted to said U-shaped frames at bottom portions thereof.

7. A utility cart according to claim 6 wherein socket means are formed in said U-shaped frame at the bottom of said legs and the castors are retained in said socket means.

8. A utility cart according to claim 1 wherein each side of said cart is formed by a plurality of said side wall segments.

9. A utility cart according to claim 1 and further comprising a central vertical spine in a central portion of said U-shaped frames and double-faced walls mounted to said central vertical spine to form a vertical partition in said cart.

10. A utility cart according to claim 9 wherein each face of said double-faced walls has drawer glides integrally molded therewith and drawers are mounted on each side of said double-faced wall in side-by-side relationship.

11. A utility cart according to claim 1 wherein said connecting means for said leg upper portions include a spanner bar rigidly joining the legs of each U-shaped frame.

12. A utility cart according to claim 11 wherein said connecting means for said leg upper portions include a top wall secured to said spanner bars.

13. A utility cart according to claim 12 wherein upper portions of said side wall segments include a socket for receiving said spanner bar.

14. A utility cart according to claim 1 and further including a back wall having a width substantially equal to the distance between said spaced side wall segments and means for slidably mounting said back wall to said side wall segments to form the back for said cart.

15. A utility cart according to claim 1 wherein said side wall segments have faces with integrally molded glides and said drawers have glide flanges mounted on the sides thereof and cooperable with said molded glides on said side wall segments.

16. A utility cart according to claim 15 wherein stop means are formed on said side wall segment glides and on said drawer glide flanges to prevent said drawers from accidental removal from said cart.

17. A utility cart according to claim 15 wherein said glides on said side wall segments are symmetrical about a vertical plane so that said drawers can be withdrawn from or pushed into said cart from the front or back thereof.

18. A utility cart according to claim 1 and further comprising doors pivotably mounted to one of said U-shaped frames upright legs, forming the front of said cart.

19. A utility cart according to claim 11 wherein the height of the opposite sides of the cart are substantially equal to the length of said legs of each U-shaped frame member; and the spanner bar bears against the upper portions of the opposite side walls.

20. A utility cart according to claim 19 wherein each side wall segment incorporates openings at the ends of said receiving means to accommodate said spanner bar and the vertical portion of the U-shaped frame member.

21. A utility cart according to claim 19 wherein each side of said cart is formed by a plurality of side wall segments.

22. A utility cart according to claim 21 and further comprising means to interlock the side wall segments on each side of the cart.

23. A utility cart according to claim 22 wherein said interlocking means is a tongue received in a corresponding groove on an adjacent side wall segment.

24. A utility cart according to claim 19 wherein the lower portion of the side wall segment bears against a bight portion of the U-shaped frames.

* * * * *